United States Patent
Haas et al.

(10) Patent No.: US 10,295,112 B2
(45) Date of Patent: May 21, 2019

(54) COLD FLOW MACHINE ANCHORING

(71) Applicant: HAAS AUTOMATION, INC., Oxnard, CA (US)

(72) Inventors: Gene F. Haas, Camarillo, CA (US); Donald Paul Earl, Oxnard, CA (US); Chris Stewart, Newbury Park, CA (US)

(73) Assignee: HAAS AUTOMATION, INC., Oxnard, CA (US)

( * ) Notice: Subject to any disclaimer, the term of this patent is extended or adjusted under 35 U.S.C. 154(b) by 0 days.

(21) Appl. No.: 15/924,117

(22) Filed: Mar. 16, 2018

(65) Prior Publication Data
US 2018/0202598 A1    Jul. 19, 2018

Related U.S. Application Data

(62) Division of application No. 13/843,709, filed on Mar. 15, 2013, now Pat. No. 9,939,099.

(51) Int. Cl.
*A47B 91/00* (2006.01)
*F16M 11/20* (2006.01)
*F16M 7/00* (2006.01)

(52) U.S. Cl.
CPC .......... *F16M 7/00* (2013.01); *Y10T 29/49826* (2015.01); *Y10T 156/10* (2015.01)

(58) Field of Classification Search
CPC .... F16M 7/00; Y10T 156/10; Y10T 29/49826
USPC ......... 248/346.2, 188.4, 188.9, 188.1, 188.2, 248/188.8; 16/42 R
See application file for complete search history.

(56) References Cited

U.S. PATENT DOCUMENTS

| | | | |
|---|---|---|---|
| 2,852,883 A | 9/1958 | Walsh | |
| 4,327,461 A * | 5/1982 | Wisniewski | A47B 91/06 16/42 R |
| 5,165,636 A * | 11/1992 | Grissom | A47B 91/04 248/188.3 |
| 5,991,974 A * | 11/1999 | Carpinella | A47B 91/066 16/30 |
| 6,981,454 B2 * | 1/2006 | Burdick | A47B 47/021 108/180 |
| 7,610,655 B2 | 11/2009 | Thaw et al. | |
| 8,191,852 B1 * | 6/2012 | Wheatley | B29C 39/025 248/188.2 |
| 8,479,899 B2 * | 7/2013 | Ohtake | F16F 1/371 188/129 |
| 8,726,463 B2 * | 5/2014 | Bushey | A47B 91/06 16/42 T |

(Continued)

*Primary Examiner* — Terrell L Mckinnon
*Assistant Examiner* — Michael McDuffie
(74) *Attorney, Agent, or Firm* — Morgan, Lewis & Bockius LLP

(57) ABSTRACT

A leveling pad for stabilizing a device is provided. The leveling pad comprises a metal base having a socket configured to receive a portion of the device and a liner coupled to the metal base and being configured to cold flow into a profile of a floor surface when a weight of the device is applied to the leveling pad. The liner may be of a polymer, such as vinyl. The liner is further configured to plastically deform into the profile of the floor surface. The plastic deformation is designed to increase a magnitude of a shear force or a tensile force required to separate the liner from a portion of the floor surface into which it is configured to plastically deform.

20 Claims, 6 Drawing Sheets

(56) References Cited

U.S. PATENT DOCUMENTS

| | | | |
|---|---|---|---|
| 2003/0102419 A1* | 6/2003 | Carnevali | A47B 23/002 248/346.2 |
| 2010/0018005 A1* | 1/2010 | Bushey | A47B 91/06 16/42 T |
| 2010/0050389 A1* | 3/2010 | Robinson | A47B 91/06 16/42 R |

* cited by examiner

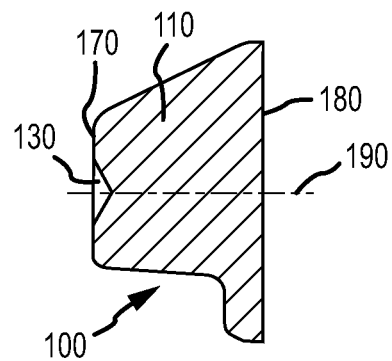
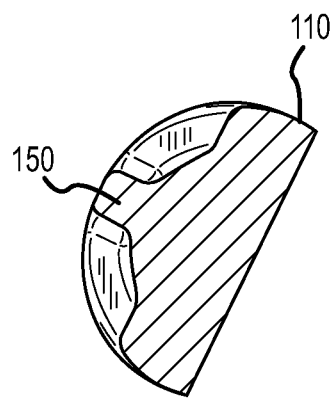
FIG.6  FIG.7
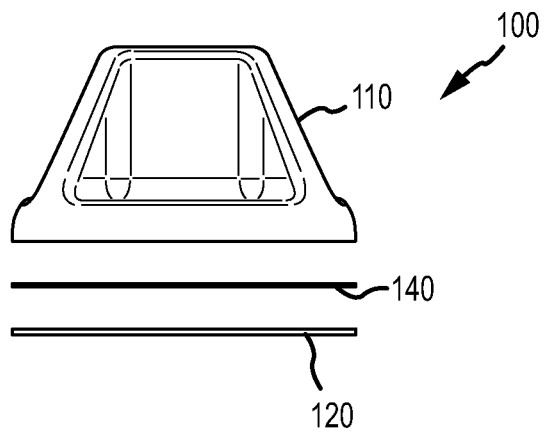
FIG.8
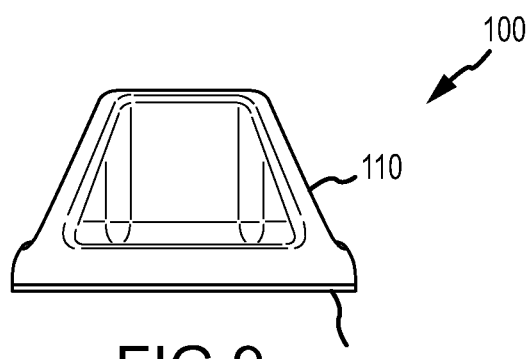
FIG.9

COLD FLOW MACHINE ANCHORING

CROSS-REFERENCES TO RELATED APPLICATIONS

This application is a divisional of U.S. patent application Ser. No. 13/843,709, filed Mar. 15, 2013, the disclosure of which is hereby incorporated herein by reference in its entirety

FIELD

The subject technology generally relates to devices for supporting and stabilizing devices and, in particular, relates to an approach for stabilizing machine tools with leveling pads configured to anchor to a floor surface.

BACKGROUND

Machine tools are power-operated tools used for finishing or shaping parts. Such tools operate by removing material from a workpiece. Basic machining operations include turning, facing, milling, drilling, boring, broaching, threading, and tapping. In addition, other operations include sawing, grinding, gear cutting, polishing, buffing, and honing. These and other operations performed by such machines generate vibrations. Vibrational energy can be detrimental to accurate and precise operation of the machine, cause the machine to travel across a floor, and create a safety hazard.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects of the subject technology, a leveling pad for stabilizing a device is provided. The leveling pad comprises a metal base having a socket configured to receive a portion of the device and a polymer liner coupled to the metal base and being configured to cold flow into a profile of a floor surface when a weight of the device is applied to the leveling pad. The metal base comprises forged aluminum. The polymer liner comprises vinyl. The polymer liner has a thickness between about 1 mm and about 3 mm. The socket is conical. The portion of the device is spherical. The polymer liner is coupled to the metal base by an adhesive configured to chemically bond to the metal base and the polymer liner. The metal base comprises a surface facing the polymer liner, wherein the surface is textured for bonding with an adhesive.

According to various aspects of the subject technology, a system for stabilizing a device is provided. The system comprises: a device comprising a chassis; a plurality of leveling screws, each being rotatably engaged with the chassis and comprising an engagement portion; and a plurality of leveling pads, each comprising: (i) a metal base having an upper surface of a first width, a lower surface of a second width, greater than the first width, and a socket extending through the upper surface and configured to receive the engagement portion of one of the leveling screws and (ii) a vinyl liner coupled to the lower surface with an adhesive configured to chemically bond to the metal base and the vinyl liner, the vinyl liner having a shape congruent to a shape of the lower surface, and the vinyl liner being configured to plastically deform into a profile of a floor surface when a weight of the device is applied to the leveling pad.

Each vinyl liner is configured to deform plastically into the profile of the floor surface when the weight of the device is applied to the leveling pad, to increase a magnitude of a tensile force required to separate the vinyl liner from a portion of the floor surface into which the vinyl liner is configured to plastically deform. An amount of a tensile force required to separate the vinyl liner from the floor surface is greater than a weight of the system when the weight of the device is applied to the leveling pad. Each vinyl liner is configured to plastically deform into the profile of the floor surface when the weight of the device is applied to the leveling pad, to increase a magnitude of a shear force required to separate the vinyl liner from a portion of the floor surface into which the vinyl liner is configured to plastically deform. The required shear force exceeds forces produced by the device during operation thereof.

Each liner has a thickness between about 1 mm and about 3 mm. Each socket is conical. Each engagement portion is spherical. Rotation of each leveling screw relative to the chassis adjusts a distance between the engagement portion and the chassis. The plurality of leveling screws is of a first material, and each of the metal bases is of a second material, softer than the first material. The second material is forged aluminum.

According to various aspects of the subject technology, a method of making a leveling pad is provided. The method comprises forming a metal base comprising a surface and a socket configured to receive a portion of a device and coupling a polymer liner to the surface of the metal base, wherein the polymer liner is configured to cold flow into a floor surface when a weight of the device is applied to the leveling pad.

The forming comprises forging the metal base from aluminum. The coupling comprises texturing the surface for bonding with an adhesive. The coupling comprises bonding the surface and the polymer liner with an adhesive, wherein the adhesive chemically bonds with the surface of the metal base and the polymer liner. The method further comprises positioning the leveling pad on the floor surface, such that the polymer liner contacts the floor surface and positioning the device on the leveling pad, such that the portion contacts the socket. The polymer liner cold flows into a profile of the floor surface under the weight of the device. The polymer liner plastically deforms into the floor surface, increasing a magnitude of a force required to separate the polymer liner from a portion of the floor surface into which the polymer liner plastically deforms.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 6 illustrates a cross-sectional view of an example of a leveling pad, in accordance with various aspects of the subject technology.

FIG. 7 illustrates a partial cross-sectional view of an example of a leveling pad, in accordance with various aspects of the subject technology.

FIG. 8 illustrates a side view of an example of a leveling pad with an unattached liner, in accordance with various aspects of the subject technology.

FIG. 9 illustrates a side view of an example of a leveling pad with an attached liner, in accordance with various aspects of the subject technology.

DETAILED DESCRIPTION

Figure 1:
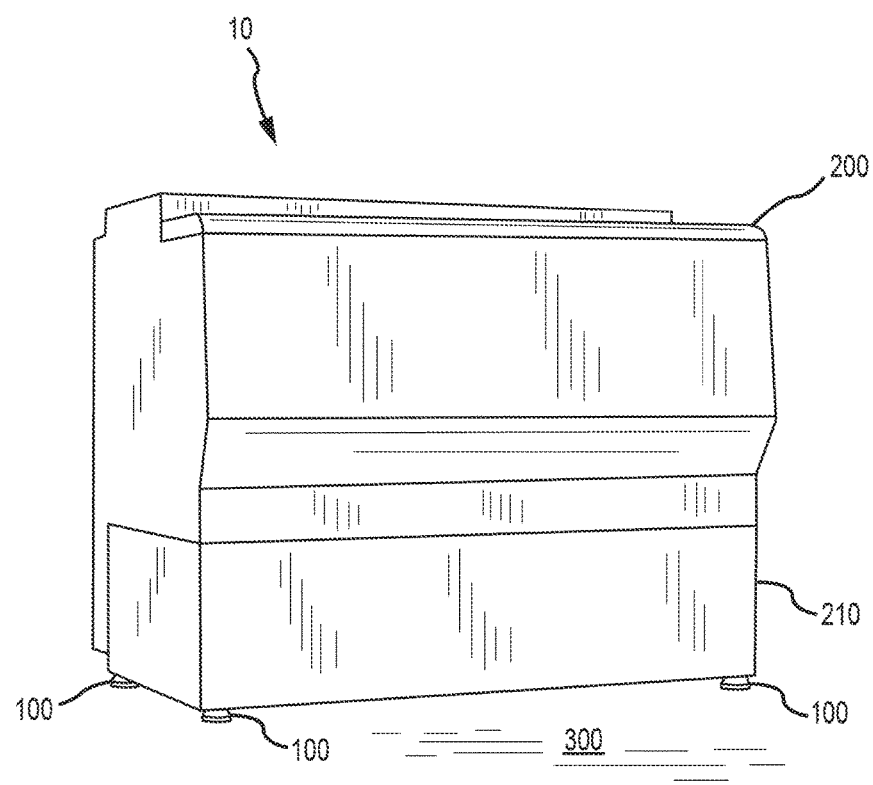
FIG. 1 illustrates a perspective view of an example of a machine system, in accordance with various aspects of the subject technology.

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

High-speed motion or rapid movement of a machine tool generates vibrations within the chassis or frame of the machine. One example of such a machine is a computer numerical control (CNC) machine tool. Vibrations generated by such machines can have an adverse effect on the machine's ability to produce a smooth uniform surface or "finish cut." A finish cut is a final pass of a cutter tool across a surface of a part and is intended to produce high quality surface finish. In practice, programmers typically write machine code to take heavy initial cuts of the raw material followed by a light finish cut pass at the end of the program. This technique typically produces the best surface quality. When axis travel speeds are increased in an attempt to reduce cycle time, frame vibration increases and surface finish quality diminishes.

Motion of heavy components within a machine also generates lateral displacement forces that cause the machine to move from its intended or original location on the floor. This event can lead to many issues including misalignment of the machine and safety concerns.

Increasing the strength and or mass of the machine frame in an attempt to reduce vibration is a possible solution, but such a modification may also require a bigger axis drive system to maintain accelerations, thereby increasing the cost of the frame and drive components. Slowing the axis travel speeds may reduce or eliminate vibrations, but such a modification adds time to the program cycle and thereby increases the production cost of each part. If frame harmonics are dampened or eliminated, high axis speeds and accelerations can be used and surface finish will not be degraded.

An industrial machine may be installed on steel or cast iron leveling pads. These pads provide a stable interface for machine leveling screws and an interface to the floor. Vibrational energy in a machine frame may be dissipated into a foundation through this type of leveling pad. However, placing steel or cast iron pads directly on a concrete floor has physical connectivity limits. If the floor is not smooth, level or flat, the pad may contact the floor at a limited number of points (e.g., at only three points). Increasing the surface area in contact with the floor is an important factor in establishing an effective energy transfer connection of the machine with the foundation.

One approach to managing harmonic vibration of the frame is to improve the physical connection of the machine to the foundation on which it sits. Some industrial machines are securely anchored to the floor upon which they sit by driving components through the surface of the floor. In practice, a machine that has been connected to the foundation is more stable, has a greater effective mass and a lower harmonic frequency than a machine that has not been anchored and uses steel pads as the foundation interface.

Anchoring a machine to the foundation in this manner is an effective means to ensure complete coupling of a machine to the floor. However, the process is labor intensive, causes damage to the floor, and does not allow the machine to be easily relocated. This limits flexibility to move machines and may require a user to core drill the foundation to accommodate the anchoring devices. Cost to install the machine increases as does the impact on adjacent machines during the preparation process.

Such machine anchoring must be well planned in advance of the actual machine installation. Anchoring after installation can be difficult in most situations. Improper anchor placement can induce clamp loads into the machine base, which force the machine out of square. Machine settling after the fact is common and can cause anchor clamp tension to diminish.

Another method used to manage the effects of frame vibration utilizes energy-absorbing pads placed between the machine and the foundation. These pads may dampen harmonic vibration in the machine frame through absorption, thereby reducing the detrimental effects and improving the cut finish. Such absorption systems may reduce the energy transmitted into the foundation, such as when used under presses and other high shock generating equipment. The technique works well to isolate machine-born shock loads from entering a foundation shared by other shock sensitive equipment. However, this technique is less effective at reducing vibration within the frame from which they originate.

Energy absorbing elastomeric pads can be expensive. Furthermore, such pads are frequency specific and weight dependant. A single installation may not provide desired benefits depending on the operating mode of the machine. Machines of different mass require different dampening characteristics and possibly different dampeners on the same machine depending on the weight distribution across the base. These systems use multiple density pads under the same machine to address this limitation. Upon installation, using improper damping pads or placing a low-density pad where a high-density pad should be actually contributes to a reduction of finish cut quality.

Dampening systems are tailored to the specific mass of a machine and in some cases, the distribution of mass within a single machine to ensure the correct dampening rate is applied for most effective results. This multiple part number solution is difficult to implement correctly and requires close management during the machine installation event. It may also require that new solutions be engineered and new product be developed depending on the specific machine, environment that the machine will be used and or certain characteristics of the machine such as dynamic weight distribution during use.

Due to the compressive nature of dampening material, a dampening pad will begin to "creep" once placed under the machine. This settling effect causes the machine going out of level and requires it to be periodically re-leveled regularly. Lastly, the ability of a dampening pad to mitigate frame-born vibration is also temperature dependant due to the nature of the material. Cool temperatures will result in an elastomeric pad increasing in density. The higher cost of special elastomeric dampening pads along with the associated variables make this solution impractical in a production setting where simple solutions are sought to avoid cost and to eliminate changes in machine performance over time and or environmental shifts in temperature.

According to various aspects of the subject technology, leveling pads of the instant disclosure provide stability for a machine by engaging a surface of a floor. According to various aspects of the subject technology, leveling pads of the instant disclosure improve the physical connection of the machine to the foundation without the need for coring. This provides a low cost solution that does not require additional labor prior to installing the machine and works on virtually all sizes of machines regardless of their mass or mass distribution. According to various aspects of the subject technology, leveling pads of the instant disclosure do not settle over time, are not affected by temperature shifts, and have a relatively low production cost. According to various aspects of the subject technology, leveling pads of the instant disclosure improve the energy coupling between the machine and the floor and thereby increase the apparent mass of the machine's base frame. This has a positive effect on how the machine responds to frame-born vibrations, which are more effectively transmitted into the foundation than through a mere steel pad. According to various aspects of the subject technology, leveling pads of the instant disclosure eliminate displacement or "walking" issues sometimes encountered with high speed lightweight CNC machines by increasing the friction coefficient interface of pad and foundation.

According to various aspects of the subject technology, as shown in FIG. 1, a system 10 comprises one or more leveling pads 100 between a device 200 and a floor 300. The device 200 may be any machine or tool, such as a device that has an operational mode in which it generates vibrational energy. For example, the device 200 may be a CNC machine tool configured to operate by removing material from a workpiece. Basic machining operations may include turning, facing, milling, drilling, boring, broaching, threading, and tapping. Other devices are also contemplated. The device 200 may be any device that operates in a single location and preferably maintains its position relative to the floor 300.

According to various aspects of the subject technology, as shown in FIGS. 2, 3, 4, and 5, one or more leveling pads 100 are provided to support the device 200. The leveling pad 100 comprises a base 110. The base 110 may be of a metal or other generally rigid material, such as forged aluminum or cast iron.

According to various aspects of the subject technology, the base 110 is configured to receive the device 200 at a socket 130 located at an upper surface 170 of the base 110. The base 110 further comprises a lower surface 180, for engaging the floor 300 by way of a liner 120. The upper surface 170 of the base 110 has a first width or cross-sectional dimension, and the lower surface 180 has a second width or cross-sectional dimension, which may be greater than the first width or cross-sectional dimension. Such a configuration provides stability by offering a relatively broader lower portion at the lower surface 180. The upper surface 170 and a lower surface 180 each have a shape or profile. For example, the lower surface 180 may be circular, to provide an even distribution of weight from the device 200. Other shapes of the upper surface 170 and the lower surface 180 are contemplated.

The base 110 transitions from the first width of the upper surface 170 to the second width of the lower surface 180. The transition may be smooth, linear, curved, tapered, stepwise, or combinations thereof. For example, the base 110 may include one or more extensions 150 (e.g., ribs, gussets, plates, etc.) extending along an axial length of the base 110. For example, as shown in FIGS. 2, 3, 4, 5, 6, and 7, the extensions 150 may extend radially outward from a central axis 190 of the base 110. The radial distance of the extensions 150 from the central axis 190 may vary along the length between the upper surface 170 and the lower surface 180. Three or more (e.g., three, four, five, six, etc.) extensions 150 are provided about the base 110. The extensions 150 may be evenly or unevenly distributed angularly about the central axis 190. The extensions 150 may extend from a central core portion, such that one or more recesses 160 remain. The use of extensions 150 with recesses 160 may reduce material costs while providing sufficient stability to the base 110.

Figure 2:
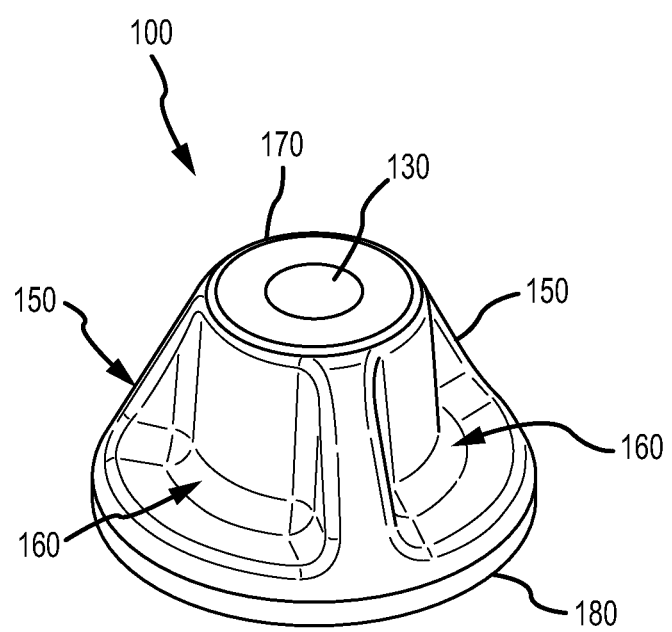
FIG. 2 illustrates an isometric view of an example of a leveling pad, in accordance with various aspects of the subject technology.
Figure 5:
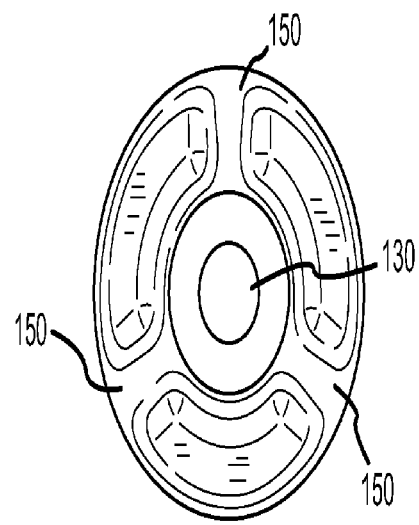
FIG. 5 illustrates a top view of an example of a leveling pad, in accordance with various aspects of the subject technology.
Figure 4:
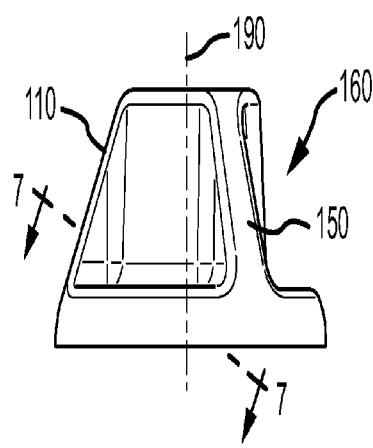
FIG. 4 illustrates a side view of an example of a leveling pad, in accordance with various aspects of the subject technology.
Figure 3:
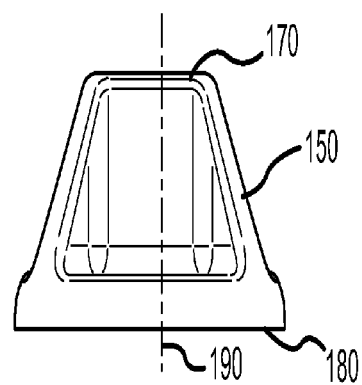
FIG. 3 illustrates a side view of an example of a leveling pad, in accordance with various aspects of the subject technology.
Figure 10:
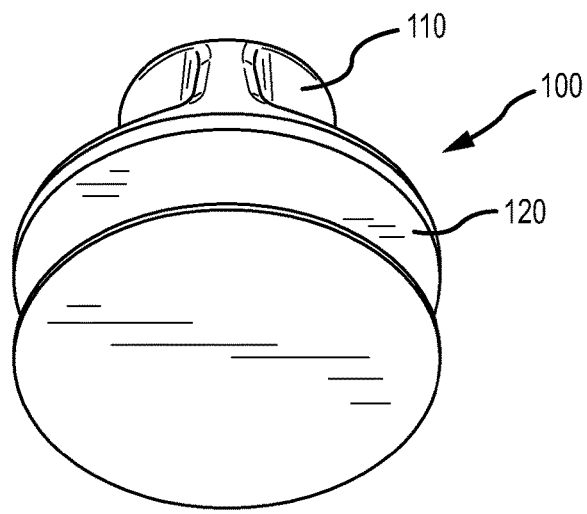
FIG. 10 illustrates an isometric view of an example of a leveling pad with an unattached liner, in accordance with various aspects of the subject technology.
Figure 11:
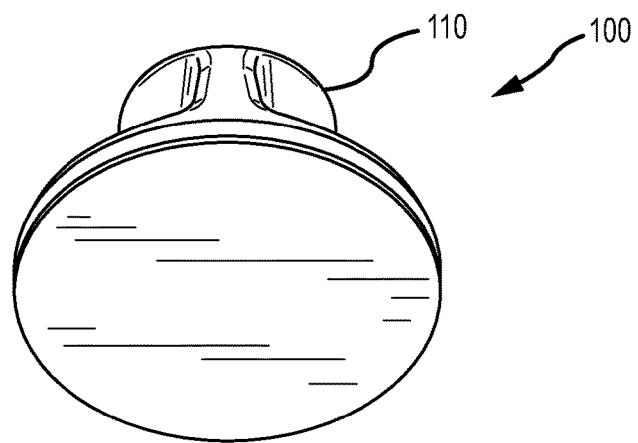
FIG. 11 illustrates an isometric view of an example of a leveling pad with an attached liner, in accordance with various aspects of the subject technology.
Figure 12:
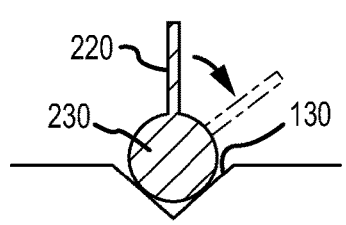
FIG. 12 illustrates a cross-sectional view of an example of a leveling pad and leveling screw, in accordance with various aspects of the subject technology.

According to various aspects of the subject technology, as shown in FIGS. 2, 5, and 12, the base 110 of the leveling pad 100 is provided with a socket 130. The socket 130 is configured to receive an engagement portion 230 of a leveling screw 220.

The engagement portion 230 is configured to releasably mate with socket 130. For example, as shown in FIG. 12, the socket 130 may be conical or frustoconical. By further example, as shown in FIG. 12, the engagement portion 230 of the leveling screw 220 is spherical or substantially spherical (e.g., forms at least a portion of the sphere). Where the socket 130 is conical and the engagement portion 230 is spherical, the region of contact between the socket 130 and the engagement portion 230 is represented by a ring. This configuration provides multiple points of contact, which may be a continuous ring (i.e., 360°). One or both of the socket 130 and the engagement portion 230 may be configured to deform somewhat under the weight of the device 200 to increase the number of contact points. As shown in FIG. 12, the points of contact along the socket 130 may be independent of the relative rotational orientation between the socket 130 and the engagement portion 230. As such, the socket 130 is able to maintain reception of the engagement portion 230 even when motion of the device 200 causes the leveling screw 220 and the engagement portion 230 to rotate, pivot, or twist relative to the leveling pad 100. Likewise, the center of engagement portion 230 is maintained at a consistent location within the socket 130. This configuration also accommodates a floor 300 that does not have a consistently level surface. For example, each leveling pad 100 may be at a unique rotational orientation relative to every other leveling pad 100 (e.g., at least one central axis 190 of a leveling pad 100 is not parallel with the other central axis 190 of every other leveling pad 100). In such an arrangement, a conical socket 130 and a spherical engagement portion 230 achieve multiple points of contact for each of the leveling pads 100, despite the floor 300 being "out of level" at certain locations.

The leveling screw 220 is configured to adjust the distance between the engagement portion 230 and the chassis 210 of the device 200. For example, the leveling screw 220 has a threaded engagement with the chassis 210, such that rotation of the leveling screw 220 relative to the chassis 210 moves the engagement portion 230 closer to or farther from the chassis 210. Accordingly, the leveling screw 220 can be adjusted as the device 200 sits upon one or more leveling pads 100.

According to various aspects of the subject technology, the leveling screw 220 is provided with a threading. Exemplary threading includes threads per inch (i.e., pitch) of 12-18 UNF, for example, 14 UNF. This configuration provides the ability to make small vertical leveling adjustments, such that the spherical engagement portion 230 fits into the conical socket 130 of the leveling pad 100. This combination of geometry creates a full contact patch ring regardless of how out of level the floor 300 is. One exemplary engagement portion 230 is of a hard material and machined smooth. The conical socket 130 of the leveling pad 100 may be formed during a forging process and may include some anomalies in the contact patch. Where the leveling pad 100 is forged from soft aluminum, anomalies in the conical socket 130 are mitigated during the leveling process when the leveling screw 220 is being turned. The weight of the device 200 eliminates the high spots in the contact patch ring of the leveling screw 220. This ensures that these two components achieve a high level of connection. In this example, the process is inherent to the materials selected for both parts and to the installation machine process. The robust contact between these two components ensures good energy transfer from the device 200 to the leveling pad 100.

According to various aspects of the subject technology, as shown in FIGS. 8, 9, 10, and 11, the base 110 of the leveling pad 100 is provided with a liner 120. The liner 120 may be configured to couple with the lower surface 180 of the base 110. The liner 120 may have the same shape and profile as that of the lower surface 180. Alternatively, the liner 120 may have a different shape and profile compared to that of the lower surface 180. According to various aspects of the subject technology, the liner 120 allows the weight of device 200 to be distributed across a significant portion of the lower surface 180 of each leveling pad 100, such that multiple points of contact (e.g., greater than three) with the floor 300 are achieved.

The liner 120 is designed to be a compliant member. Materials for the liner 120 include polymer materials. For example, the liner 120 may be of vinyl. By further example, the liner 120 may be of rubber, high-density foam, polyvinyl chloride, or other plastic. The liner 120 may be of a homogenous material. The liner 120 may be provided without any coating or skin.

The liner 120 has a thickness that provides stability while allowing the material to engage a floor surface. Factors to consider when selecting a thickness of the liner 120 include (i) adequate thickness to accommodate irregularities in the lower surface 180 of the base 110 and the profile of the floor 300 and (ii) adequate thinness to avoid excessive compression under the weight of the device 200. Permitting excessive compression may cause the device 200 to go out of level as the material of the vinyl 120 compresses further over time. For example, the liner 120 is about 2 mm thick. By further example, the liner 120 has a thickness of about 0.5 mm, about 1.0 mm, about 1.5 mm, about 2.0 mm, about 2.5 mm, about 3.0 mm, about 3.5 mm, about 4.0 mm, or about 4.5 mm. By further example, the liner 120 has a thickness of about 5 mm, about 6 mm, about 7 mm, about 8 mm, about 9 mm, about 10 mm, about 11 mm, about 12 mm, or about 13 mm. By further example, the liner 120 has a thickness of between about 1 mm, and about 3 mm.

The liner 120 has a hardness that provides stability while allowing the material to engage a floor surface. For example, the liner 120 has a hardness of between about 60 Shore A and about 85 Shore D durometer.

The liner 120 is coupled to the base 110 with an adhesive 140. The adhesive 140 may be an epoxy or conventional adhesive material. Factors to consider in selection of an appropriate adhesive 140 include work life of the adhesive, viscosity, and chemical bond affinity both to the lower surface 180 of the base 110 and to the liner 120. The adhesive 140 should have a viscosity that allows even spreading across the bottom of the base 110 to provide a uniform distribution. Bubbles between the disk and pad surface should be avoided to reduce or eliminate high spots that would prevent the liner 120 from obtaining full contact on the floor 300. For example, an adhesive 140 should be selected to bond to both a metal (e.g., aluminum) base 110 and a polymer (e.g., vinyl) liner 120.

According to embodiments, a liner 120 or a base 110 may be prepared prior to application of an adhesive 140. The liner 120 or base 110, or a surface thereof, may be cleaned to remove foreign debris, oil, or other substances that may interfere with bonding between the adhesive 140 and the liner 120 or base 110. The liner 120 or base 110, or a surface thereof, may be textured, for example, by treatment with an abrasive material. Roughening a surface of the liner 120 or base 110 with sandpaper or another abrasive material generally increases the amount of surface area available for bonding with the adhesive 140.

According to embodiments, an even distribution of adhesive 140 may be provided to a base 110 by a method that reduces or eliminates air bubbles. In such a method, an amount of the adhesive 140 is provided to opposing surfaces of two different bases 110. The two bases 110 are rubbed together, such that the adhesive 140 is spread across the surfaces of each of the two bases 110. This action may cause the bases 110 to move laterally relative to each other. The relative motion may be circular (i.e., orbiting), back-and-forth linearly, or along another pathway as needed to evenly distribute the adhesive 140 across an entirety of each surface. Such action reduces or eliminates air bubbles between the adhesive 140 and the base 110 by allowing the air bubbles to escape to the atmosphere and the adhesive 140 to infiltrate a greater proportion of the surface of the base 110. When the adhesive 140 is sufficiently distributed across the surface of the bases 110, the bases 110 are separated, such that each of the surfaces maintains a layer of the adhesive 140. The liner 120 is brought to the surface of the base 110 that contains the keys of 140, such that the liner 120 faces the adhesive 140. The liner 120 is "walked" across the surface of the base 110 by bringing a first edge of the base 110 into contact with a first edge of the liner 120. Subsequently, an angle formed by the liner 120 and the base 110 at the point of contact between them is reduced, such that an increasing amount of contact is achieved between the liner 120 and the adhesive 140 on the base 110. This process reduces or eliminates the number of air bubbles occurring between the liner 120 and the adhesive 140.

Adhesive 140 may be or be part of a double-sided tape with high tack characteristics to bond with both the base 110 and the liner 120. A counter bore (e.g., recess) may be cut into the base 110 at the lower surface 180. The depth of the counter bore may be less than the thickness of the liner 170, for example, one-half the thickness of the liner 120. The counter bore provides a pocket to capture the liner 120 and prevented it from translating off the base 110. The diameter of the counter bore may match outer diameter of the liner 120.

The lower surface 180 of the base 110 may be prepared to facilitate enhanced bonding with the adhesive 140. For example, the lower surface 180 may be machined to increase its surface area by creating an uneven (e.g., textured) surface. Alternatively, the base 110 may be prepared by a process that requires no additional treatment. For example, the base 100 may be of forged aluminum, which would be adequately prepared to receive the adhesive 140 and the liner 120. By further example, a mere cleaning process may be all that is require to prepare the base 100 to receive the adhesive 140 and the liner 120.

After the machine is lowered onto the leveling pads 100 and leveled, the material of the liner 120 is compressed into the floor 300 under the weight of the device 200. After a short period, the material of the liner 120 cold flows into the profile of the floor 300. The process occurs across a given span of time, for example, 24-48 hours, depending on the temperature of the floor surface. As used herein, "cold flow" is a viscous flow of a solid, accompanied by a distortion of the solid under sustained pressure. Where the liner 120 is subject to a cold flow process under the weight of the device 200 and in the presence of the floor 300, the liner 120 distorts to conform to a profile of the floor 300. Even where the floor 300 has a very small surface profile (i.e., minor deviations from a perfect plane), the result is intimate contact or coupling of the liner 120 with the floor 300. This intimate contact or coupling has a high degree of shared surface contact between the liner 120 and the floor 300. As such, the liner 120 and the floor 300 acquire an engagement that requires a substantial force to remove the leveling pad 100 from the floor 300.

This cold flow process has been shown to provide intimate engagement with a variety of floor types. For example, concrete floors, painted floors, and polished floors facilitate engagement of a liner 120 there with, properly anchoring a device 200 with the foundation.

While the liner 200 does deform somewhat to conform to the profile of the floor 300, the effect of this cold flow process does not affect the leveling of the device 200, as the process occurs on a relatively small scale. Having completed the cold flow process, the resulting engagement with the floor 300 is maintained, despite changes across the range of normal machine operating temperatures. To demonstrate the effectiveness of this process, leveling pads that once hosted machines can only be removed from the floor by use of a mallet.

Liner 120 is configured to plastically deform into a profile of the floor 300 when the weight of the device 200 is applied to the leveling pad 100.

This deformation and conformity to the profile of the floor 300 increases a magnitude of a tensile force required to separate the liner 120 from the portion of the floor 300 into which the liner 120 has deformed. For example, an amount of the tensile force required to separate the liners 120 from the floor 300 is greater than the combined weight of the system 10 (device 200 and leveling pads 100) when the weight of the device 200 is applied to the leveling pads 100. That is to say, the leveling pads 100 retain a strong engagement with the floor 300 even after the device 200 is removed from the leveling pads 100. The deformation and conformity to the profile of the floor 300 also increases a magnitude of a shear force required to separate the liner 120 from the portion of the floor 300 into which the liner 120 has deformed.

Figure 13:
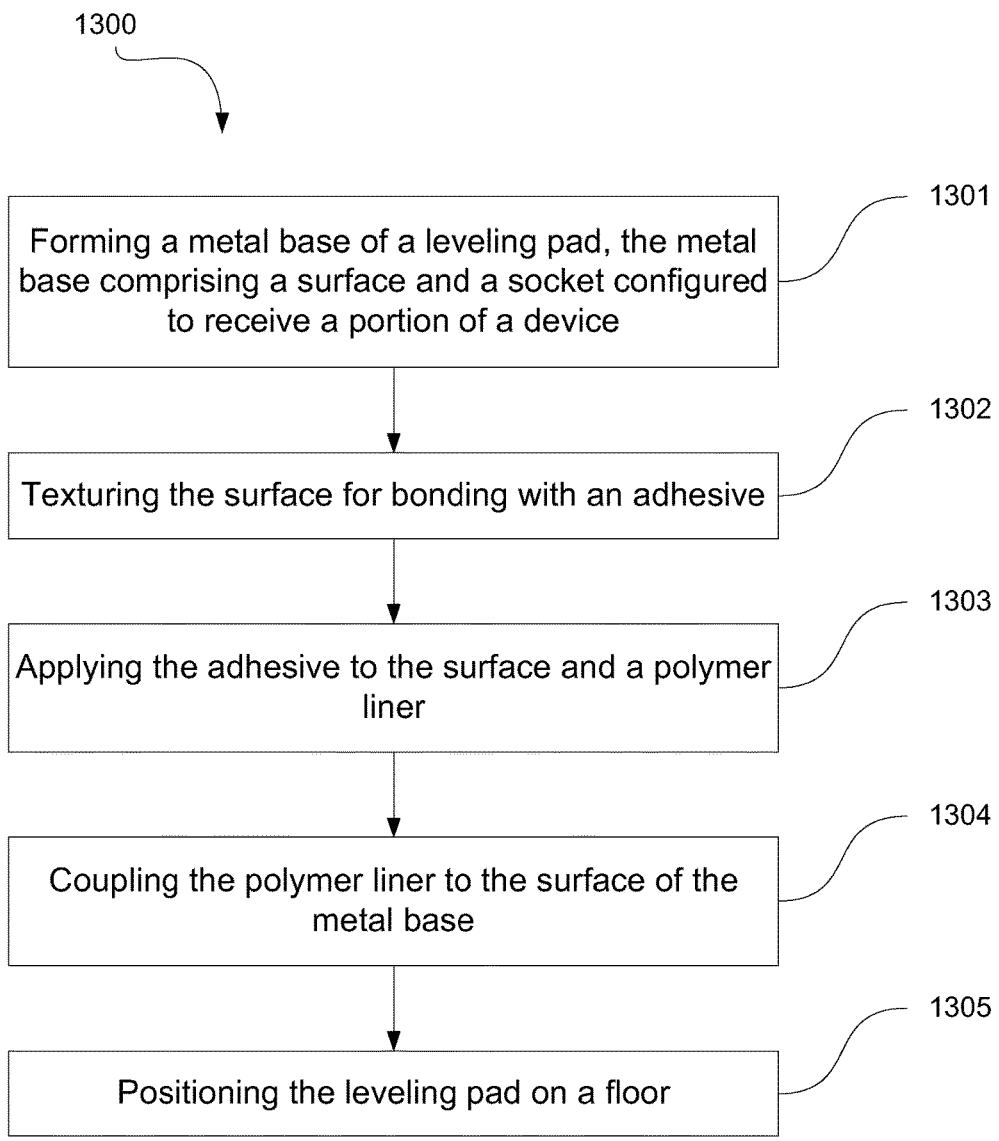
FIG. 13 illustrates a flow chart of an example method of making a leveling pad, in accordance with various aspects of the subject technology.

A method 1300 of making a leveling pad 100 of the instant disclosure includes forming a base 110 to have a lower surface 180 and a socket 130 configured to receive a portion of a device 200, such as a leveling screw 220. As shown in FIG. 13, steps are illustrated to make a leveling pad 100 and/or to install the same. As shown in step 1301, the method includes forming a base of a leveling pad, the metal base comprising a surface and a socket configured to receive a portion of a device. As shown in step 1302, the method further includes texturing the surface for bonding with an adhesive. As discussed herein, the texturing is either a result of the forming of the base 110 (e.g., by forging) or, alternatively, as a step separate and subsequent to the forming. As shown in step 1303, the method further includes applying the adhesive to the surface and to a liner. As shown in step 1304, the method includes coupling the polymer liner to the surface of the base. The coupling is accomplished by bonding the liner 120 to the lower surface 180 or by another type of engagement. As shown in step 1305, the method further includes positioning the leveling pad on a floor. One or more leveling pads 100 are provided to a floor 300, with the liner 120 of each in contact with the floor 300. A device 200 is provided on the leveling pads 100, with the leveling screws 220 of the device 200 engaging the sockets 130 of the leveling pads 100. The leveling screws 220 can be adjusted to level the device 200 as desired. Under the weight of the device 200, the liner 120 cold flows—or deforms—to conform to a profile of the floor 300. As such, the liner 120 acquires an intimate engagement with the floor 300, by which an increased tensile or sheer force would be required to remove the leveling pad 100 from the floor 300, even after the device 200 is removed.

The configurations disclosed herein utilizes the weight of the machine to naturally cold flow the liner 120 into the natural surface profile of a floor 300, thereby effectively coupling the device 200 to the foundation without the use of labor-intensive methods or expensive dampening systems.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
    a device comprising a chassis;
    a plurality of leveling screws, each being rotatably engaged with the chassis and comprising an engagement portion; and
    a plurality of leveling pads, each comprising:
        a metal base having an upper surface, a lower surface, and a socket extending through the upper surface and configured to receive the engagement portion of one of the leveling screws; and
        a vinyl liner coupled to the lower surface with an adhesive, the vinyl liner being configured to plastically deform into a profile of a floor surface when a weight of the device is applied to the leveling pad.

2. The leveling pad of claim 1, wherein each vinyl liner is configured to plastically deform to increase a magnitude of a tensile force required to separate the vinyl liner from the floor surface.

3. The leveling pad of claim 2, wherein an amount of the tensile force required to separate the vinyl liner from the floor surface is greater than a weight of the system when the weight of the device is applied to the leveling pad.

4. The leveling pad of claim 1, wherein each vinyl liner is configured to plastically deform to increase a magnitude of a shear force required to separate the vinyl liner from the floor surface.

5. The leveling pad of claim 4, wherein the required shear force exceeds forces produced by the device during operation thereof.

6. The leveling pad of claim 5, wherein each socket is conical.

7. The leveling pad of claim 6, wherein each engagement portion is spherical.

8. The leveling pad of claim 7, wherein rotation of each leveling screw relative to the chassis adjusts a distance between the engagement portion and the chassis.

9. The leveling pad of claim 8, wherein the plurality of leveling screws is of a first material, and each of the metal bases is of a second material, softer than the first material.

10. The leveling pad of claim 9, wherein the second material is forged aluminum.

11. A system comprising:
a device comprising a chassis;
a plurality of leveling screws, each being rotatably engaged with the chassis and comprising an engagement portion; and
leveling pads for stabilizing the device, the leveling pads each comprising:
a metal base having a socket configured to receive a portion of the device; and
a polymer liner coupled to the metal base and being configured to cold flow into a profile of a floor surface and plastically deform into the profile when a weight of the device is applied to the leveling pad.

12. The system of claim 11, wherein the metal base comprises forged aluminum.

13. The system of claim 11, wherein the polymer liner comprises vinyl.

14. The system of claim 11, wherein the polymer liner has a thickness between about 1 mm and about 3 mm.

15. The system of claim 11, wherein the socket is conical.

16. The system of claim 11, wherein the portion of the device is spherical.

17. A method comprising:
positioning a plurality of leveling pads on a floor surface, each of the leveling pads comprising:
a metal base having an upper surface, a lower surface, and a socket extending through the upper surface and configured to receive an engagement portion of leveling screws; and
a vinyl liner coupled to the lower surface with an adhesive;
applying a weight of a device to the leveling pads via leveling screws, so that the vinyl liner plastically deforms into a profile of the floor surface; and
adjusting at least one of the leveling screws to adjust a distribution of the weight among the leveling pads.

18. The method of claim 17, wherein each vinyl liner is configured to plastically deform to increase a magnitude of a tensile force required to separate the vinyl liner from the floor surface.

19. The method of claim 17, wherein each vinyl liner is configured to plastically deform to increase a magnitude of a shear force required to separate the vinyl liner from the floor surface.

20. The method of claim 19, further comprising operating the device in a mode that produces a shear force that does not exceed the shear force required to separate the vinyl liner from the floor surface.

* * * * *